(12) United States Patent
Masuda et al.

(10) Patent No.: US 7,610,594 B2
(45) Date of Patent: Oct. 27, 2009

(54) METHOD OF MANUFACTURING ROTARY DRIVING DEVICE BY SHAVING A SURFACE OF A TURNTABLE WITH A CUTTING TOOL HAVING A FLAT CUTTING EDGE

(75) Inventors: Kumio Masuda, Tottori (JP); Makoto Tabata, Tottori (JP); Taiji Futaoka, Shimane (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 11/222,918

(22) Filed: Sep. 9, 2005

(65) Prior Publication Data

US 2007/0000119 A1    Jan. 4, 2007

(30) Foreign Application Priority Data

Jul. 1, 2005   (JP)   ............... 2005-193379

(51) Int. Cl.
  *G11B 17/03*   (2006.01)
  *G11B 17/028*  (2006.01)
(52) U.S. Cl. ...................... 720/716; 720/698
(58) Field of Classification Search ............ 720/716, 720/698
   See application file for complete search history.

(56) References Cited

U.S. PATENT DOCUMENTS

| | | | | |
|---|---|---|---|---|
| 3,800,099 A | * | 3/1974 | Dickopp et al. | 369/16 |
| 3,939,517 A | * | 2/1976 | Bivens | 15/53.2 |
| 4,841,516 A | * | 6/1989 | Ohmori et al. | 369/264 |
| 5,995,480 A | * | 11/1999 | Naka et al. | 720/716 |
| 6,568,884 B2 | * | 5/2003 | Mies | 409/1 |
| 6,577,587 B1 | * | 6/2003 | Kishibe et al. | 720/700 |
| 6,678,234 B2 | | 1/2004 | Ho et al. | |
| 6,871,352 B2 | * | 3/2005 | Kurosaka et al. | 720/707 |
| 6,911,748 B2 | * | 6/2005 | Kull | 310/67 R |

FOREIGN PATENT DOCUMENTS

| | | |
|---|---|---|
| JP | 06-290537 | 10/1994 |
| JP | 09-027166 | 1/1997 |
| JP | 10-302385 | 11/1998 |
| JP | 11-025555 | 1/1999 |
| JP | 2002-238224 | 8/2002 |

* cited by examiner

*Primary Examiner*—David D Davis
(74) *Attorney, Agent, or Firm*—RatnerPrestia

(57) ABSTRACT

A method of manufacturing a rotary driving device is disclosed. The method includes the steps of: mounting a turntable, which is equipped with an anti-slipping section on a disc-placeable surface, to a rotary shaft; rotating the turntable; and shaving off a disc-contact surface, with which a disc contacts when the disc is placed, of the anti-slipping section with a cutting tool through a cutting off machining method from outside of the disc-placeable surface toward the rotary shaft. A cutting edge of the cutting tool is placed widthwise in parallel with an end face of the anti-slipping section and thickness-wise along an axial direction of the rotary shaft. The cutting edge is set such that the sections of the tool other than the cutting edge do not touch the anti-slipping section.

12 Claims, 7 Drawing Sheets

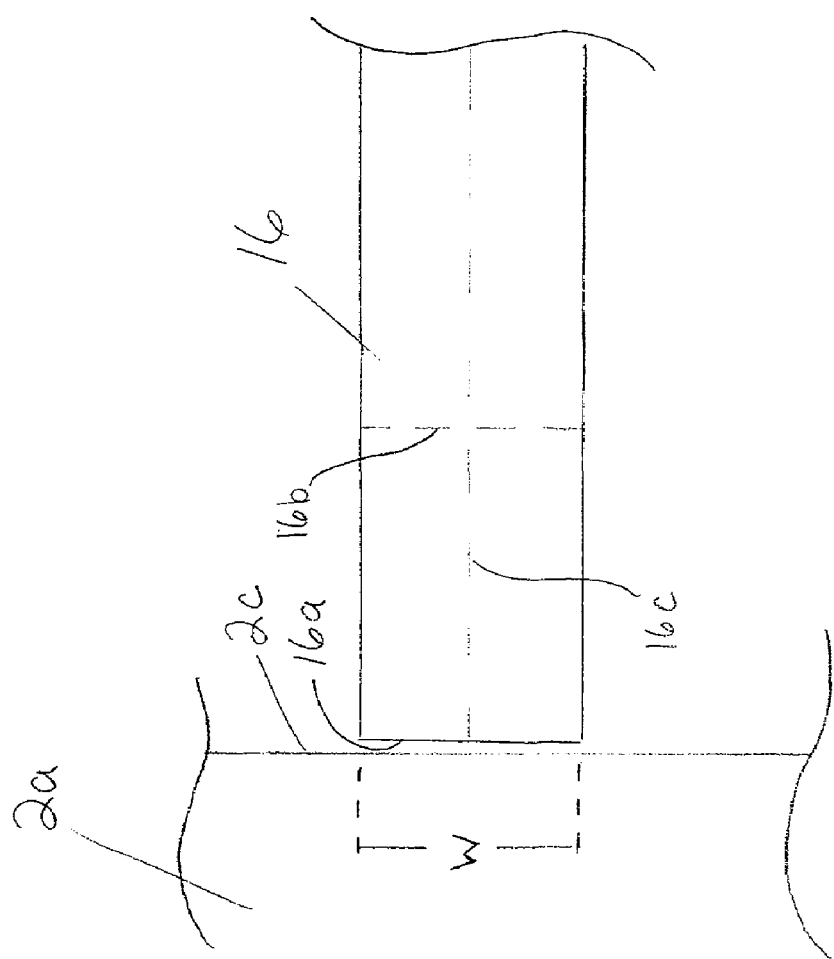

METHOD OF MANUFACTURING ROTARY DRIVING DEVICE BY SHAVING A SURFACE OF A TURNTABLE WITH A CUTTING TOOL HAVING A FLAT CUTTING EDGE

FIELD OF THE INVENTION

The present invention relates to manufacturing methods of driving devices, such as a spindle motor, for driving rotary units such as recording discs in the optical media field, e.g. CD-ROM(R), DVD-ROM(R) and DVD-RAM, and it also relates to the same driving devices.

BACKGROUND OF THE INVENTION

A spindle motor, one of the examples of driving devices, is used for driving disc-shaped recording media such as CD-ROM(R) disc, DVD-ROM(R) disc and DVD-RAM disc. The spindle motor often employs a brush-less DC motor, and is equipped with a turntable, on which a recording medium (an example of rotary units) is mounted, and a driving section for driving the turntable.

The driving section comprises the following elements:
 a motor frame;
 a rotor supported rotatably by the motor frame; and
 a stator placed in the motor frame such that it surrounds and confronts the rotor.

The turntable and the rotor need to synchronize their rotations, so that the turntable is press-fitted or rigidly bonded to the rotary shaft of the rotor.

Manufacturing the foregoing spindle motor, i.e. the device used for driving discs, requires improving an accuracy of wobble, i.e. vertical deviation, of the turntable in the vertical direction ("vertical deviation" is a term expressing characteristics). To be more specific, a tolerance of wobble is not more than 30 µm for DVD disc driving devices, and not more than 20 µm for DVD-ROM disc driving devices.

When the spindle motor wobbles during its operation, the recording medium mounted to the motor also wobbles, then a distance between the medium and the head placed closely to the medium changes, so that information cannot be sometimes read or written correctly from or to the medium. This surface wobble, i.e. vertical deviation, often depends on an accuracy of individual components of the motor or an accuracy of mounting the turntable to the rotary shaft. As a result, the vertical deviation due to motor rotation differs in respective spindle motors, and uniform vertical deviations cannot be expected. In order to reduce the vertical deviation as hard as possible, a higher machining accuracy of respective components or a higher assembling accuracy have been pursued.

The spindle motors of this kind have a speed range from approx. 200 to 12000 rpm. CD-ROM disc driving devices and DVD-ROM disc dividing devices, among others, frequently repeat acceleration to a higher rpm and deceleration to a lower rpm, so that abrupt change of torque works, which tends to produce slips between the turntable and the disc.

In order to prevent the slips, a sheet-like or a ring-shaped anti-slipping member has been conventionally bonded on the disc-placeable surface of the turntable. However, this conventional turntable has encountered the following problems: difficulty of manufacturing the anti-slipping member at a uniform thickness, and difficulty of applying the adhesive at a uniform thickness. Those problems cause the vertical deviation of the turntable.

A variety of turntables coated by various anti-slipping films are proposed for solving the forgoing problems. For instance, liquid rubber or liquid thermoplastic resin is printed or sprayed onto the disc-placeable surface of the turntable, then the rubber or the resin is hardened and bonded to the surface by heating or drying. Since this anti-slipping film is printed or sprayed on the turntable, a uniform thickness is obtainable with ease, so that a surface flatness can be easily achieved. This method is thus effective for preventing the vertical deviation of the turntables. This is disclosed in patent document 1, i.e. Japanese Patent Non-examined Publication No. H06-290537.

DVD disc driving devices for driving recordable discs such as DVD-R and DVD-RAM, which have recently become widespread, are required to have an accuracy of vertical deviation as low as not greater than 10 µm, and yet, will be required to have a more strict accuracy. However, the foregoing turntable, of which disc-placeable surface is coated with one of a variety of anti-slipping films, has a limit to keep down the dispersion in accuracy of mounting the turntable to the rotary shaft. It is thus difficult to achieve the more strict accuracy of vertical deviation.

On the other hand, reduction of vertical deviation of a disc placed on a turntable is proposed. The proposal is this: anti-slipping member on a disc-placeable surface is machined such that its surface forms right angles with a rotary shaft of the turntable, thereby reducing the vertical deviation of the disc during the rotation of the turntable. This idea is disclosed, e.g. in patent document 2, i.e. Japanese Patent Non-examined Publication No. H11-25555.

FIG. 5 shows the method disclosed in patent document 2. In FIG. 5, motor 322 is driven to rotate rotor-case 321, and cutting tool 325 is brought from on high into contact with friction member 324 fixed on the disc placeable surface of turntable 323. Cutting tool 325 is moved by a traverse device (not shown) along a direction perpendicular to rotary axis Z of spindle shaft 321b for machining the surface of friction member 324. This method can reduce the vertical deviation of a disc during the rotation of the turntable.

Another method is disclosed is in patent document 3, i.e. Japanese Patent Non-examined Publication No. 2002-238224. Anti-slipping member on a disc-placeable surface of a turntable is polished to be a plane perpendicular to a rotary shaft of a turntable, so that vertical deviation of a disc is reduced.

FIG. 6 shows the method disclosed in patent document 3. In FIG. 6, first of all, rotate turntable (carrier interface) 330 along a first rotating direction, thereby rotating anti-slipping sheet 331 on the disc placeable surface along the first rotating direction. Sheet 331 is formed of a material selected from the group consisting of rubber, silicon, and epoxy. Next, polish sheet 331 with polisher 332 (e.g. round whetstone) rotating along a second rotating direction. During the polishing, polisher 332 moves vertically with respect to the axial direction of shaft 333. As a result, an accuracy of vertical orientation between the surface of anti-slipping sheet 331 and shaft 333 is increased by the polishing, so that the vibration problem due to the vertical deviation of disc can be solved.

According to the methods disclosed in patent documents 2 and 3, a higher accuracy of vertical deviation of turntable's disc-placeable surface is achievable regardless of the accuracy of mounting a turntable to a rotary shaft or the accuracy of coating a disc-placeable surface with anti-slipping film.

The anti-slipping member previously discussed is preferably excellent in anti-slip property (i.e. frictional force), abrasive resistance, and weather resistance, and it is also preferable not to produce blocking between a turntable and a disc. Materials satisfying those requirements have been proposed, for instance, patent document 4, i.e. Japanese Patent Non-examined Publication No. H09-27166 discloses such materials.

As a memory capacity and a reading speed of optical-medium increase, inner disturbing vibrations generated by motor rotations and outer disturbing vibrations, such as vibrations or impacts applied from the outside to the driving devices, have drawn attention as another problem. Those vibrations travel to a disc via a turntable, and generates resonance vibrations on the disc. As a result, an optical pickup cannot read or write signals from/to the disc, so that the device cannot work properly.

In order to solve the foregoing problem, a structure satisfying both the needs simultaneously is proposed, i.e. one need is to convey rotary driving force of a motor enough for disc rotation to the disc and, the other need is to attenuate vibrations generated on the disc and causing abnormality of the device. Such a structure is disclosed in, e.g. patent document 5, i.e. Japanese Patent Non-examined Publication No. H10-302385.

FIG. 7 shows the structure disclosed in patent document 5. Turntable 340 includes a multi-layer structure, i.e. surface elastic layer 341 (anti-slipping section) for conveying the rotary driving force of the motor to a disc and damping vibration elastic layer 342 for damping the vibrations generated in the disc. Layer 341 and layer 342 are bonded with adhesive, when necessary, on the disc-placeable surface of the turntable.

The recordable DVD-disc driving devices have increased their speed, so that the anti-slipping property becomes the more important factor to be achieved. Thus it is crucial to finish anti-slipping faces of disc-placeable surfaces on turntables with a higher accuracy both in roughness and flatness. A rough surface or insufficient flatness will reduce the practical contact area between the anti-slipping face and a disc, so that anti-slipping force is lowered.

However, it is difficult to finish any one of the members previously discussed with a high accuracy by the shaving described in patent document 2 or the polishing described in patent document 3. The members have problems in the processing (machining or polishing), and a hardness of the anti-slipping members cannot be further increased because of maintaining the anti-slipping property. This is another factor to make the processing more difficult.

Although the foregoing conventional processing method of the anti-slipping section of the disc-placeable surface is indeed good enough for achieving a higher accuracy of vertical deviation, the conventional method encounters difficulty of finishing the anti-slipping face with a high accuracy both in a surface roughness and flatness.

Since the anti-slipping member is made of rubber or resin, an edge of the cutting tool tends to gather cut-chips thereon during the shaving, so that a temperature at the edge rapidly rises, thereby shortening the life of the cutting tool. A greater curvature of an edge of the cutting tool and a smaller feeding pitch of the cutting tool are necessary, in general, for the shaving process to achieve a smaller roughness on the surface. This condition makes the edge of the cutting tool tend to gather cut-chips thereon. It is thus difficult to satisfy both of the requirements (i.e. long life of the tool and avoidance of cut-chips).

It is also very difficult to polish soft material such as rubber or resin with a whetstone, because the surface subjected to polishing tends to be rough and produce much abrasive powder. A smaller roughness cannot be expected, and the abrasive powder easily attach to the surface, so that the flatness tends to lower.

In the case of the multi-layer structure including the damping vibration elastic layer which damps vibrations generated on discs, since plural materials are layered, it is more difficult to achieve a higher accuracy with the foregoing shaving or polishing.

SUMMARY OF THE INVENTION

A method of manufacturing the rotary driving device of the present invention comprises the steps of:
  (a) mounting a turntable, of which disc-placeable surface has an anti-slipping section, to a rotary shaft;
  (b) rotating the turntable; and
  (c) shaving off a surface of the anti-slipping section, which surface is to be contact with a disc when the disc is placed, along a direction from outside of the disc-placeable surface toward the rotary shaft with a cutting tool through a cutting off machining method, and a cutting edge of the cutting tool is placed widthwise in parallel with an end face of the anti-slipping section and thickness-wise along the axial direction of the rotary shaft.

This method allows achieving not only a high accuracy of surface wobble, i.e. vertical deviation, of the anti-slipping section on the disc-placeable surface of the turntable, but also a high accuracy of a surface roughness and flatness of the disc-placeable surface.

The rotary driving device of the present invention comprises the following elements:
  (a) a turntable of which disc-placeable surface has an anti-slipping section;
  (b) a rotary shaft to which the turntable is mounted;
  (c) a rotor frame fixed to the rotary shaft;
  (d) a rotor magnet mounted to the rotor frame;
  (e) stator cores wound with stator coils and placed confronting the rotor magnet;
  (f) a bracket holding the stator cores; and
  (g) a bearing fixed to the bracket and supporting the rotary shaft.

In order to correct the vertical deviation of the disc-placeable surface during the rotation of the turntable, a disc contact surface of the anti-slipping section is shaved off by a cutting tool. This tool is set such that an edge of the tool is placed widthwise in parallel with an end face of the anti-slipping section with which the disc is brought into contact when the disc is placed, and thickness-wise in an axial direction of the rotary shaft. The contact face is shaved off along the direction from the outside of the disc-placeable surface toward the rotary shaft during the rotation of the turntable.

The foregoing structure allows providing a rotary driving device of which disc-placeable surface of the turntable having an anti-slipping section that is finished with not only a high accuracy of the vertical deviation, but also a high accuracy of a surface roughness and flatness.

BRIEF DESCRIPTION OF THE DRAWINGS

FIG. 2E is a top view of a portion of FIG. 2A used to illustrate a method of processing an anti-slipping section of a disc-placeable surface of a turntable in accordance with the first embodiment of the present invention.

FIG. 6 shows a sectional view illustrating a structure of a second conventional motor.

DETAILED DESCRIPTION OF PREFERRED EMBODIMENT

Exemplary embodiments of the present invention are demonstrated hereinafter with reference to the accompanying drawings.

First Exemplary Embodiment

Figure 1:
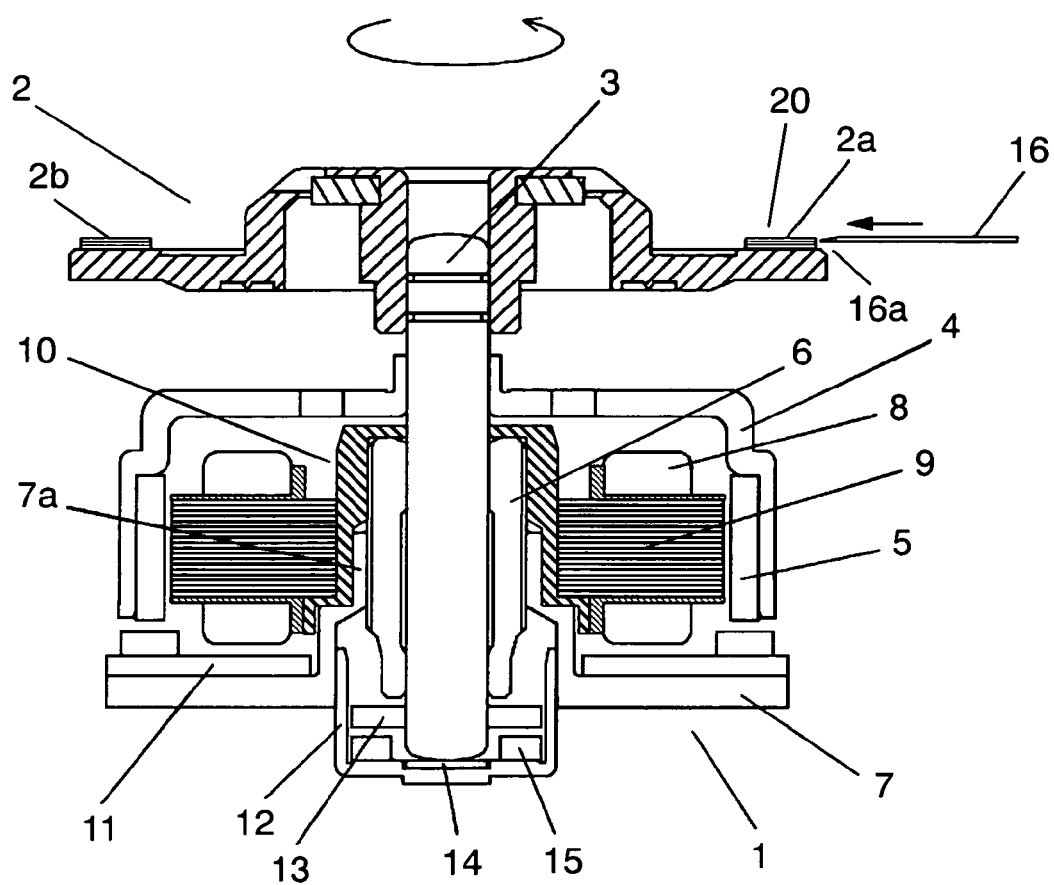
FIG. 1 shows a sectional view illustrating a structure of a rotary driving device in accordance with a first exemplary embodiment of the present invention.
Figure 2A:
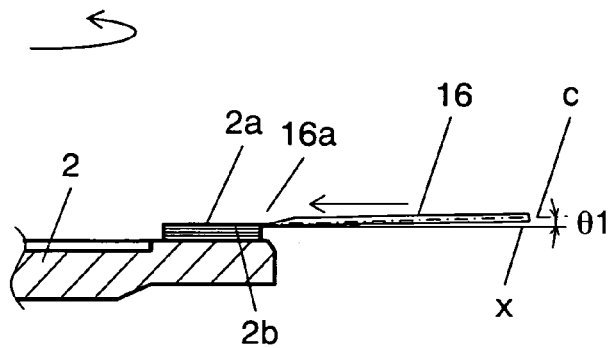
FIG. 2A-FIG. 2C schematically illustrate a method of processing an anti-slipping section of a disc-placeable surface of a turntable in accordance with the first embodiment of the present invention.
Figure 2B:
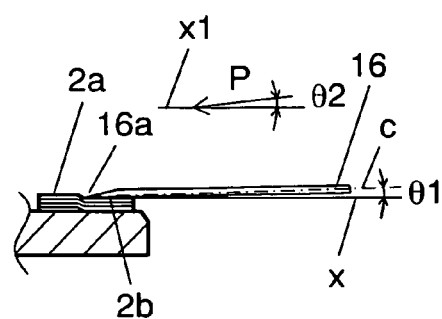
Figure 2C:
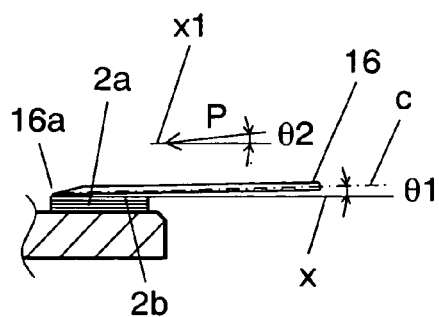

FIG. 1 shows a sectional view illustrating a structure of a rotary driving device (spindle motor) in accordance with the first exemplary embodiment of the present invention. FIG. 2A-FIG. 2C schematically illustrate a method of processing an anti-slipping section of a disc-placeable surface of a turntable in accordance with the first embodiment of the present invention.

In FIG. 1, turntable 2 is used for placing a disc thereon, and has disc-placeable section 20, which includes anti-slipping section 2a for preventing the disc from slipping during the rotation of turntable 2. Anti-slipping section 2a is formed of a ring-shaped anti-slipping member, made from rubber or resin, fixed to disc-placeable section 20 with adhesive.

Rotary shaft 3 is fixed at its center hole by press-fitting or the like. Rotary shaft 3 is fixed to a burring process section provided at the center of rotor frame 4 by, e.g. direct press-fitting. On an inner wall of rotor frame 4, ring-shaped rotor magnet 5, magnetized multi-polarities along the circular direction, are fixed by press fitting or with adhesive.

Bracket 7 is formed by pressing magnetic material, and has protruded metal retainer 7a at its approx. center. Oilless bearing 6 is press-fitted into retainer 7a.

On the other hand, stator cores 9 are formed by laminating silicon steel plates, and are wound by stator coil 8 via an insulating member. Each one of stator cores 9 has metal holder 10 made from insulating resin and inserted into its center. Parts of an inner wall of metal holder 10 are fixed to an outer wall of metal retainer 7a by press-fitting or bonding.

Stator cores 9 confront rotor magnet 5 via air gap in-between. Further, printed circuit board 11, having at least parts of a circuit for driving and controlling spindle motor 1, is fixed to bracket 7 by bonding. A lead-end of the winding on stator coil 8 is wired on printed circuit board 11.

Next, rotary shaft 3 is inserted into oilless bearing 6 to be supported in a radial direction, and ring-shaped thrust ring 13 made from magnetic material is fixed at a given place of rotary shaft 3 by press-fitting from the lower end of shaft 3 in FIG. 1. Cup-shaped thrust cup 12 made from magnetic material is press-fitted along the lower inner wall of metal retainer 7a of bracket 7 from the lower end of retainer 7a. Thrust cup 12 is fixed at a given place such that rotor magnet 5 confronts stator cores 9.

On the bottom of thrust cup 12, thrust receptor 14 is disposed in advance to contact with a tip of rotary shaft 3 for supporting shaft 3 in the thrust direction. Ring-shaped thrust-attracting magnet 15 is also disposed in advance at a place confronting thrust ring 13. Magnetic attracting force working between magnet 15 and thrust ring 13 made of magnetic material stabilizes the deviation of turntable 2 in the thrust direction. The foregoing elements and mechanism form spindle motor 1.

Anti-slipping member 2a, i.e. disc-placeable section 20 of turntable 2, undergoes a cutting off machining, namely, anti-slipping section 2a is shaved its surface 2b to be contacted with a disc by cutting tool 16 in the following way: While turntable 2 is rotated by spindle motor 1, cutting tool 16 is brought. into contact with anti-slipping member 2a from the outside of disc-placeable section 20 with tool 16 moving toward the rotary shaft. Tool 16 is set such that its cutting edge 16a is placed widthwise in generally parallel with an end face of anti-slipping section 2a and thickness-wise generally along an axial direction of rotary shaft 3. Other sections of tool 16 than edge 16a are set not to contact anti-slipping section 2a. In other words, only edge 16a of cutting tool 16 is set to contact with anti-slipping section 2a. Then cutting edge 16a is oriented from the outside of disc-paceable section 20 toward rotary shaft 3. Different from the conventional shaving method, which brings a cutting tool in contact with a surface to be shaved from on high for shaving off the surface, the method of the present invention brings the cutting tool in contact with the surface, namely, disc-paceable section 20, from a side face of the section 20, so that surface 2b to be contacted with a disc is shaved.

FIG. 2A-FIG. 2E-detail the method of shaving off the anti-slipping section. Dotted line 16b in FIG. 2E shows the position where the slope of the cutting tool 16 changes, as shown in FIG. 2A. Dotted line 16c in FIG. 2E shows the longitudinal axis of cutting tool 16. As shown in FIGS. 2A and 2E, cutting tool 16 is set in the following state: Place cutting edge 16a widthwise W in parallel with the end face 2c of anti-slipping section 2a, and thickness-wise along the axial direction of rotary shaft 3. Bring cutting edge 16a contact with anti-slipping section 2a from the lateral face of section 2a. At this time, the position of cutting tool 16 meets such a condition as center line C of cutting tool 16 forms given angle $\theta 1$ with plane X perpendicular to rotary shaft 3 in order to prevent the other sections of tool 16 than edge 16a from touching anti-slipping section 2a. A greater angle $\theta 1$ will increase a cutting angle of tool 16 and produce a greater resistance at the surface to be shaved, so that the surface tends to be tore off unevenly. As a result, an accurate machining cannot be expected. A smaller angle $\theta 1$ will involve the sections of tool 16 other than edge 16a in touching with the subject surface of anti-slipping section 2a, so that scratches are produced and cut-powder attaches to the subject surface. Angle θ1 thus needs to be set to avoid at least the following problem: The sections of tool 16 other than edge 16a touch the subject surface of anti-slipping section 2a due to a tilt or run-out of the end face of anti-slipping section 2a.

Cutting tool 16 placed as described above shaves off disc-contact surface 2b from the outside, namely, from the end face of anti-slipping section 2a of turntable 2, toward the center of rotary shaft 3 as shown in FIG. 2B. At this time, cutting tool 16 is moved from the outside of turntable 2 toward rotary shaft 3, along a downward slant at angle θ2 with respect to direction X1 perpendicular to rotary shaft 3, up to the position shown in FIG. 2C. Tool 16 thus shaves off disc-contact surface 2b of anti-slipping section 2a. Reference mark "P" shown in FIG. 2B shows the moving direction of tool 16, and angle θ2 shows a tilt angle of "P" with respect to plane X1.

Figure 2D:
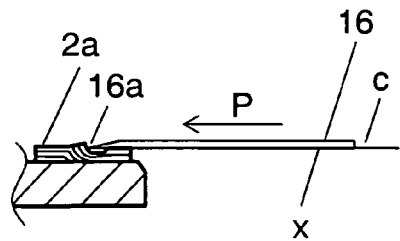
FIG. 2D illustrates a processing status where a cutting tool moves perpendicularly to a rotary shaft.
Figure 3A:
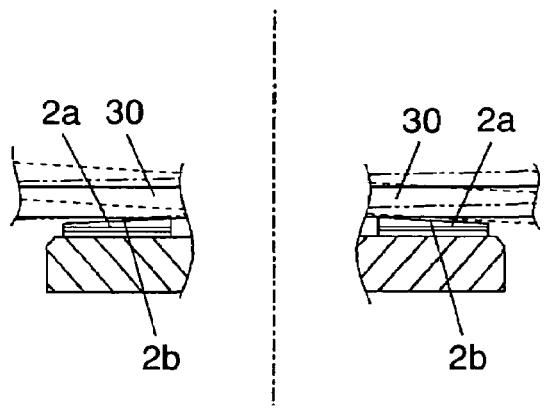
FIG. 3A shows a sectional view of an anti-slipping section of a disc-placeable surface on a turntable prepared for being compared with the one in accordance with the first embodiment.
Figure 3B:
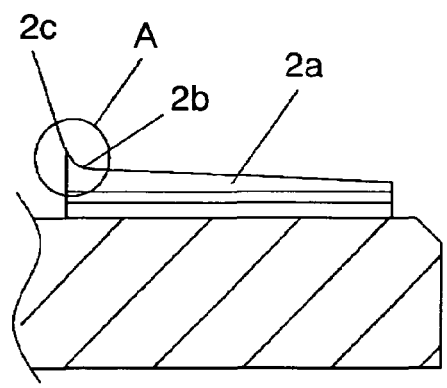
FIG. 3B shows an enlarged sectional view illustrating an essential part of the anti-slipping section shown in FIG. 3A.

FIG. 2D shows a shaving state when angle θ2 is 0 degree, i.e. "P" is in parallel with plane X1. In this case, cutting tool 16 applies a pressure onto the subject surface of anti-slipping section 2a, and produces distortion, so that the surface having distortion is machined, and when tool 16 leaves the subject surface, i.e. when the machining is finished, disc-contact surface 2b becomes a slant thickening toward its inside as shown in FIG. 3A. On top of that, burrs 2C occur around the inner rim of disc-contact surface 2b as shown in the circular of FIG. 3B.

If disc-contact surface 2b becomes the slant thickening toward the inside, disc 30 tends to be placed slantingly along the slant of disc-contact surface 2b as shown with a broken line or a two-dot chain line in FIG. 3A. If the burrs occur, a greater tilt is produced, and indeed no tilt on disc-contact surface 2b is ideal, but practically it is extremely difficult to eliminate dispersions of the surface condition due to the processing.

Figure 3C:
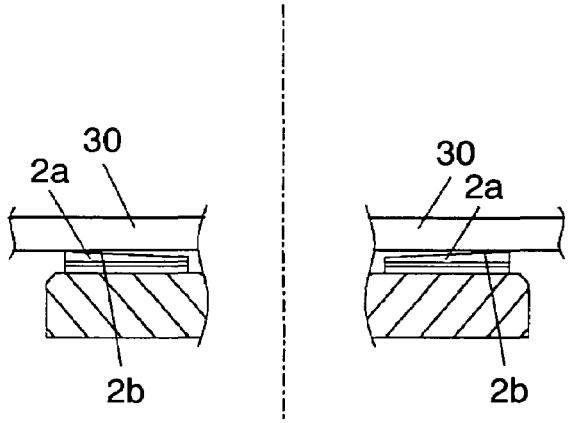
FIG. 3C shows a sectional view of the anti-slipping section of the disc-placeable surface on the turntable in accordance with the first embodiment of the present invention.

Disc-contact surface 2b with a slant thickening toward its outer rim as shown in FIG. 3C does not produce a tilt on disc 30, and suppresses the burrs.

Figure 3D:
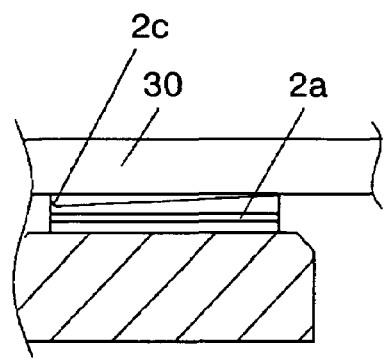
FIG. 3D shows an enlarged sectional view illustrating an essential part of the anti-slipping section shown in FIG. 3C.

Smaller burrs 2c as shown in FIG. 3D will not produce a tilt on disc 30 as far as their heights fall within a height of the outer rim of the disc-placeable surface. However, the greater tilt of this slant will reduce a contact area between disc-contact surface 2b and the disc, so that the frictional force lowers. Angle θ1 set adequate will reduce a pressure applied at the shaving, and on top of this setting, angle θ2 set at not less than 0 degree will correct the slant of disc-contact surface 2b to be slightly thickening toward the outer rim as shown in FIG. 3D. Those settings eliminate the burrs and the slant of discs, and minimize the reduction of the contact area. The sections of tool 16 other than cutting edge 16a do not touch the subject surface, which is then free from scratches and cut-chips.

In this first embodiment, anti-slipping section 2a employs chloroprene rubber excellent in abrasive resistance and weather resistance. This rubber has a greater coefficient of friction and rather better vibration-damping property. While turntable 2 rotates at a rotational speed ranging from 4000 rpm to 6000 rpm by rotating spindle motor 1 for itself, the shaving discussed above is carried out in various conditions.

The inventors find that the finest shaving accuracy is obtainable at angle θ1 falling within 1-2 degrees and angle θ2 falling within 0.1-0.2 degree.

Second Exemplary Embodiment

Figure 4A:
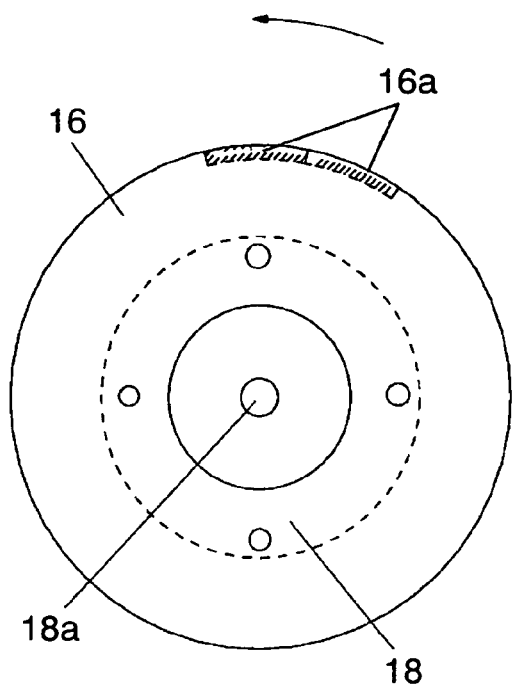
FIG. 4A shows a plan view illustrating a cutting tool and a mounted status of the cutting tool in accordance with a second exemplary embodiment of the present invention.
Figure 4B:
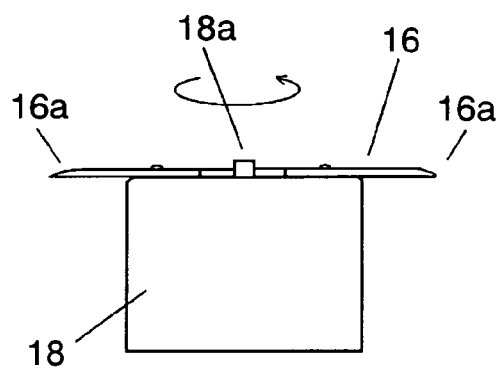
FIG. 4B shows a sectional view illustrating the mounted status of the cutting tool in accordance with the second exemplary embodiment of the present invention.

FIG. 4A-FIG. 4D show a cutting tool in accordance with the second exemplary embodiment of the present invention. In FIG. 4A, cutting tool 16 shapes like a disc having sequential cutting edges 16a on its outer rim. As shown in FIG. 4B, this disc-shaped cutting tool 16 is mounted onto rotary table 18 having rotary shaft 18a coaxial with the center of cutting tool 16. This structure allows rotating edge 16a worn due to shaving by a given angle with respect to the center of cutting tool 16, thereby confronting virgin edge 16a with the subject surface. Edges 16a are formed at the positions equidistantly from rotary shaft 18a, which is a reference point of rotary table 18, so that cutting edges 16a can be replaced with a virgin one in a short time without changing the shaving conditions. As a result, highly accurate shaving is achievable at extremely high productivity.

Figure 4C:
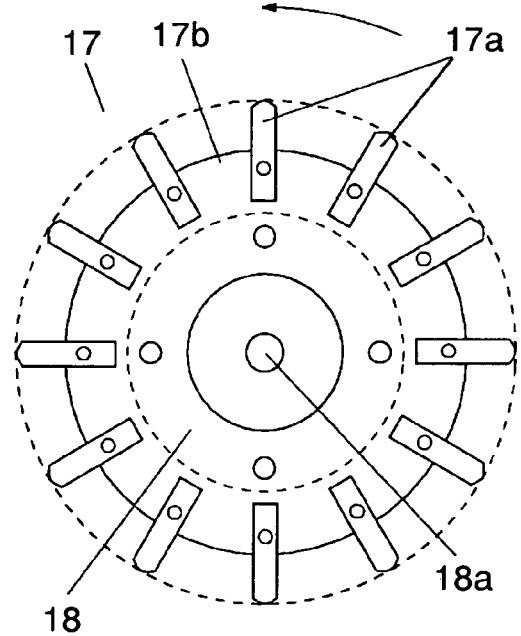
FIG. 4C shows a plan view illustrating a mounted status of another cutting tool in accordance with the second exemplary embodiment of the present invention.
Figure 4D:
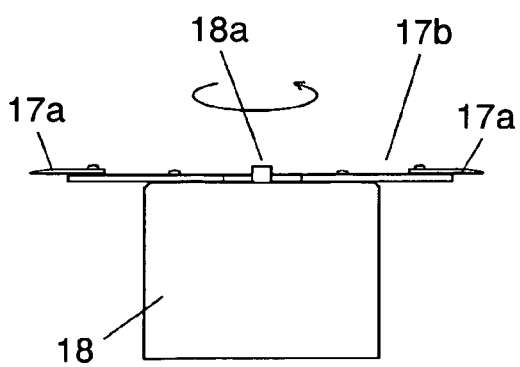
FIG. 4D shows a sectional view illustrating the mounted status of the same cutting tool and shown in FIG. 4C in accordance with the second exemplary embodiment of the present invention.
Figure 5:
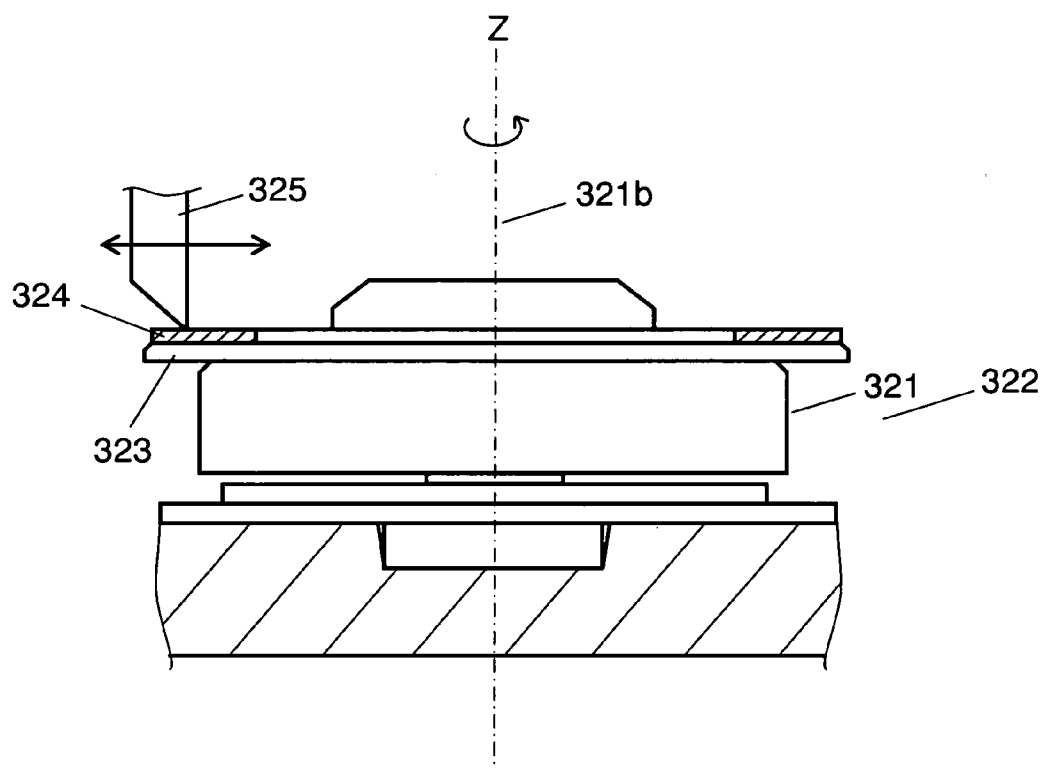
FIG. 5 shows a sectional view illustrating a structure of a first conventional motor.
Figure 7:
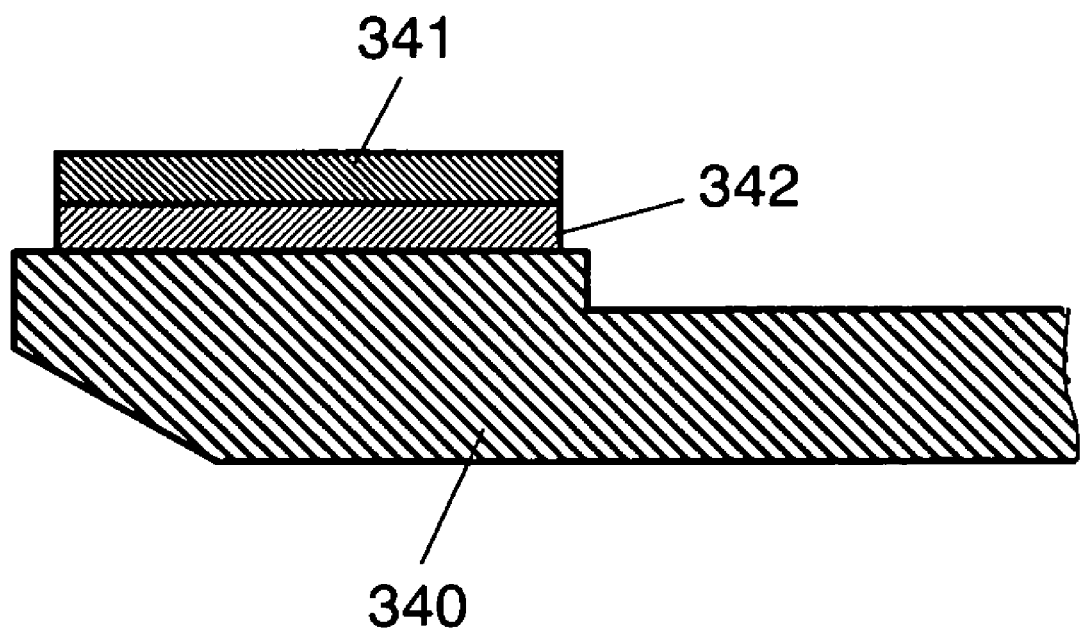
FIG. 7 shows a sectional view illustrating a structure of a third conventional motor.

FIG. 4C shows another shape of cutting tool 17, i.e. plural cutting chips can be mounted on the outer rim of a disc with spaces between the chips. In this case, cutting edges 17a of the plural chips are arranged on one circular and mounted to table 17b, which is then mounted onto rotary table 18 having rotary shaft 18a coaxial with the center of table 17b as shown in FIG. 4D. This is the same mechanism as disc-shaped cutting tool 16 shown in FIG. 4B. Cutting tool 17 thus produces an advantage similar to that of cutting tool 16 shown in FIG. 4A. On top of that, wider selection of materials of individual cutting chips is allowed, and the shape of cutting edges 17a can be accurately finished with ease. As a result, materials and edge-shapes adequate for the shaving can be advantageously employed.

In the foregoing respective embodiments, spindle motor 1 spins with turntable 2 integrated into a part of the rotary driving device, so that turntable 2 rotates for the shaving step (cutting off machining). Instead of the foregoing method, turntable 2 is fixed to rotary shaft 3, and some external driving force not by spindle motor 1 can be applied to rotary shaft 3 to rotate turntable 2 for the shaving step (cutting off machining).

As discussed above, the method of manufacturing the rotary driving device of the present invention allows correcting the wobble, i.e. vertical deviation, of a disc-placeable surface by the following steps:

placing a cutting edge of a cutting tool widthwise in parallel with an end face of an anti-slipping section and thickness-wise along an axial direction of the rotary shaft; and, shaving off a disc-contact surface of the anti-slipping section on the disc-placeable surface with the cutting tool through the cutting off machining from the outside of the surface toward the center of the rotary shaft.

As a result, the rotary driving device with high accuracy of the vertical deviation of the subject surface is obtainable without achieving strict accuracy both in machining and assembling of individual components.

On top of the foregoing method, a cutting tool is applied to a lateral face of the disc-placeable surface and moved toward the rotary shaft for shaving off the surface, so that the subject surface is hardly subjected to influences of shapes and feeding pitches of the cutting edge. The cutting tool is placed such that the sections of the cutting tool other than the cutting edge do not touch the anti-slipping section. The cutting edge is then moved to shave off the subject surface along a slant having a downward angle with respect to a perpendicular direction to the rotary shaft from the outside of the turntable toward the rotary shaft. This method allows correcting distortion of the subject surface, which distortion is produced by pressure applied from the cutting tool during the cutting off machining, and reducing scratches as well as burrs. This method also prevents for cut-chips to attach to the subject surface. As a result, not only the vertical deviation (surface wobble) but also surface roughness and flatness of the subject surface can be finished with high accuracy, so that rotary driving devices having a disc-placeable surface with high accuracy can be steadily provided.

The foregoing manufacturing method of the present invention is useful for manufacturing the turntables to be driven by spindle motors used as disc-driving devices in apparatuses which record or reproduce information in CD-ROM(R/RW) discs or DVD±(R/RW) discs.

The rotary driving device of the present invention includes an anti-slipping section on a disc-placeable surface of the turntable, and the anti-slipping section is accurately finished in not only vertical deviation (surface wobble) but also surface roughness and flatness.

What is claimed is:

1. A method of manufacturing a rotary driving device, the method comprising the steps of:
   (a) mounting a turntable to a rotary shaft, the turntable being equipped with an anti-slipping section on a disc-placeable surface;
   (b) rotating the turntable;
   (c) providing a cutting tool having (i) a flat cutting edge substantially orthogonal to (a) an axial direction of the rotary shaft and (b) a longitudinal axis of the cutting tool and (ii) a height substantially parallel to an axial direction of the rotary shaft; and
   (d) shaving off a disc-contact surface, with which a disc contacts when the disc is placed, of the anti-slipping section with the cutting tool from outside of the disc-placeable surface toward the rotary shaft,
   wherein the flat cutting edge of the cutting tool is placed widthwise in parallel with an end face of the anti-slipping section and thickness-wise along an axial direction of the rotary shaft and the height of the cutting tool increases as the cutting tool extends away from the rotary shaft.

2. The manufacturing method of claim 1, wherein the anti-slipping section is formed of one of resin and rubber.

3. The manufacturing method of claim 1, wherein the cutting tool is placed such that a center line of the tool forms a given angle $\theta 1$ with a plane perpendicular to the rotary shaft.

4. The manufacturing method of claim 3, wherein the given angle $\theta 1$ is set between 1 degree and 2 degrees.

5. The manufacturing method of claim 1 further comprising the step of:

(d) shaving off the disc-contact surface with the cutting tool through the cutting off machining method from the outside of the turntable toward the rotary shaft, wherein the cutting edge is moved along a slope having a downward angle $\theta 2$ with respect to a perpendicular direction to the rotary shaft.

6. The manufacturing method of claim 5, wherein the given angle $\theta 2$ is set between 0.1 degree and 0.2 degree.

7. The manufacturing method of claim 1, wherein the cutting tool is shaped like a disc, and the cutting edges are formed on an outer rim of the disc-shaped tool.

8. The manufacturing method of claim 1, wherein the cutting tool is formed by mounting a plurality of cutting chips on an outer rim of a disc with an interval between the chips.

9. The manufacturing method of claim 1, wherein the rotary driving device comprising:
   the rotary shaft disposed at a center of the turntable;
   a rotor frame fixed to the rotary shaft;
   a rotor magnet mounted to the rotor frame;
   a stator core, on which a stator coil is wound, confronting the rotor magnet;
   a bracket holding the stator core; and
   a bearing fixed to the bracket and supporting the rotary shaft.

10. The manufacturing method of claim 1, wherein the disc-contact surface undergoes the cutting off machining after the turntable is integrated into the rotary driving device.

11. The manufacturing method of claim 1, wherein the cutting off machining is to shave off the anti-slipping section of the disc-placeable surface for correcting vertical deviation of the disc-placeable surface, which vertical deviation occurs while the turntable is rotated.

12. A method of manufacturing a rotary driving device, the method comprising the steps of:
   (a) mounting a turntable to a rotary shaft, the turntable being equipped with an anti-slipping section on a disc-placeable surface;
   (b) rotating the turntable; and
   (c) shaving off a disc-contact surface, with which a disc contacts when the disc is placed, of the anti-slipping section with a cutting tool through a cutting off machining method from outside of the disc-placeable surface toward the rotary shaft, wherein a cutting edge of the cutting tool is placed widthwise in parallel with an end face of the anti-slipping section and thickness-wise along an axial direction of the rotary shaft and the disc-contact surface is shaved off absent rotation about the longitudinal axis of the cutting tool,
   wherein the cutting tool is placed such that a center line of the tool forms a given angle $\theta 1$ in the range of about 1 degree to about 2 degrees with a plane perpendicular to the rotary shaft.

* * * * *